C. E. NORTH.
PLOW.
APPLICATION FILED JULY 17, 1912.
1,068,922.
Patented July 29, 1913.
2 SHEETS—SHEET 1.
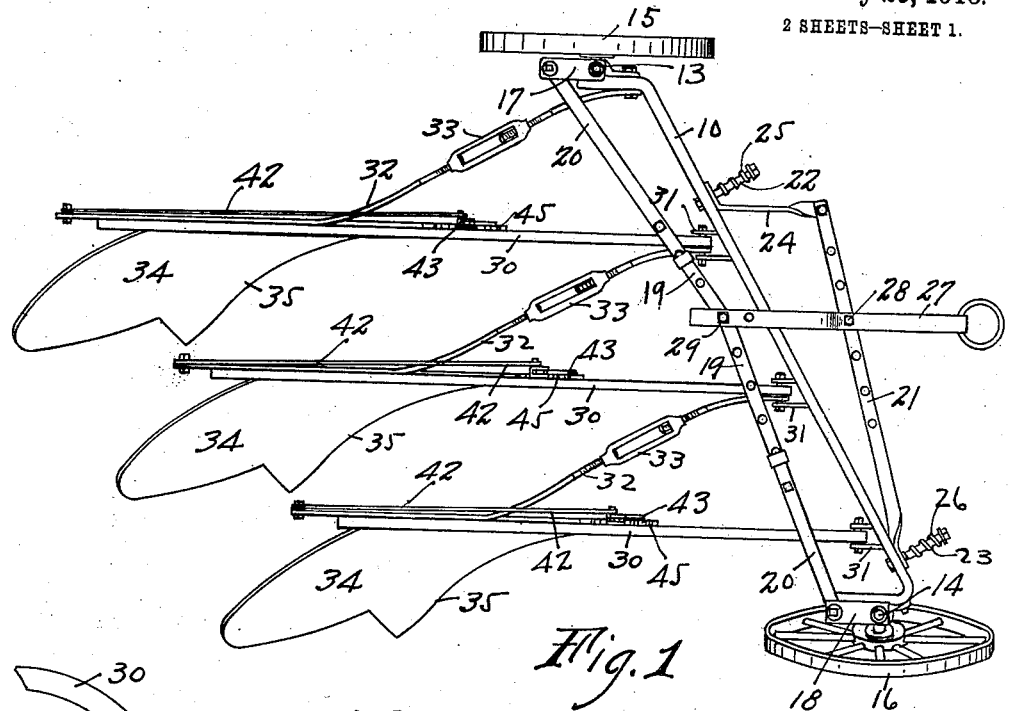
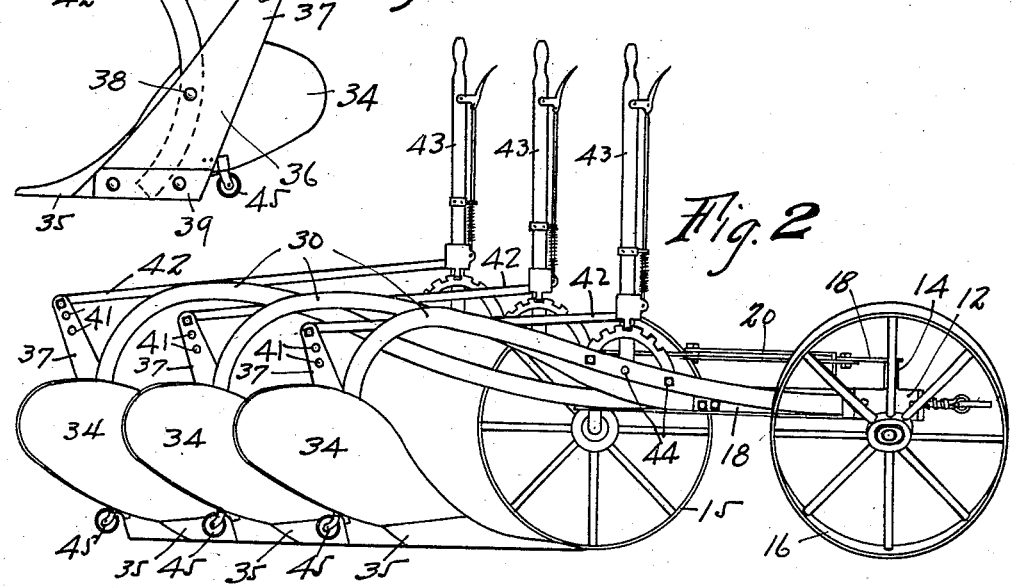
WITNESSES
INVENTOR
Charles E. North
Mason, Fenwick & Lawrence
ATTORNEYS C. E. NORTH.
PLOW.
APPLICATION FILED JULY 17, 1912.
1,068,922.
Patented July 29, 1913.
2 SHEETS—SHEET 2.
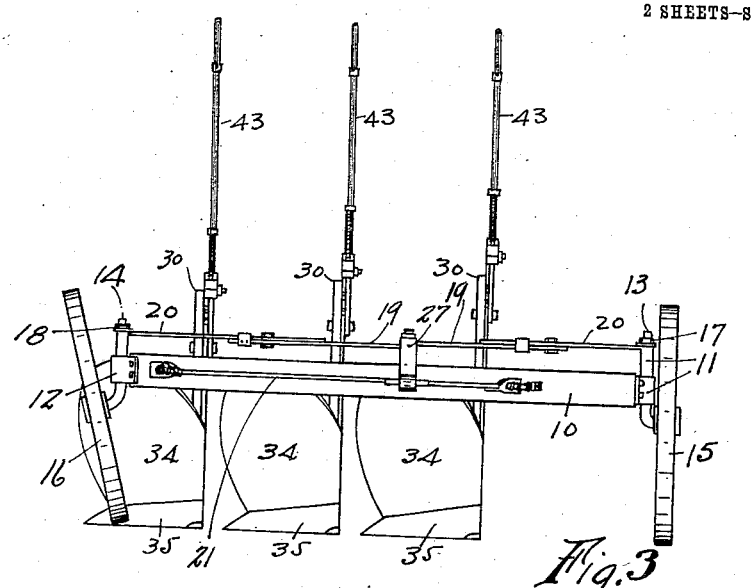
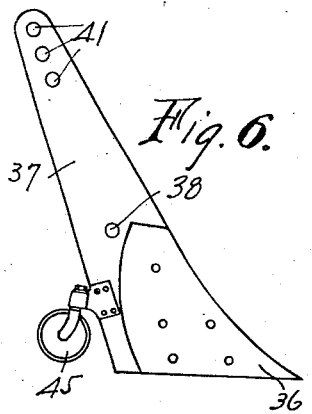
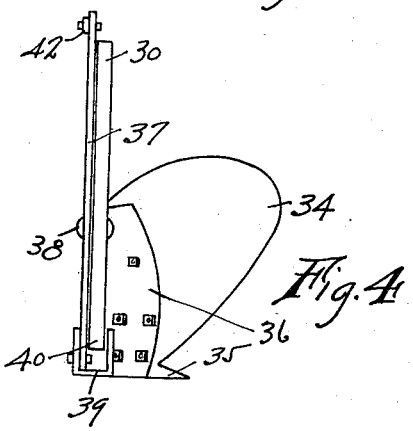
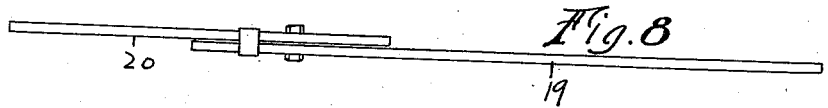
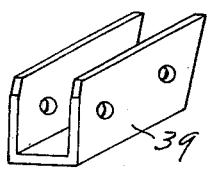
WITNESSES
INVENTOR
Charles E. North,
Mason, Fenwick + Lawrence
ATTORNEYS

UNITED STATES PATENT OFFICE.

CHARLES E. NORTH, OF SPOKANE, WASHINGTON.

PLOW.

1,068,922. Specification of Letters Patent. Patented July 29, 1913.

Application filed July 17, 1912. Serial No. 709,992.

*To all whom it may concern:*

Be it known that I, CHARLES E. NORTH, a citizen of the United States, residing at Spokane, in the county of Spokane and State of Washington, have invented certain new and useful Improvements in Plows; and I do hereby declare the following to be a full, clear, and exact description of the invention, such as will enable others skilled in the art to which it appertains to make and use the same.

This invention relates to plows and has for an object to provide a plow pivotally connected with the beam with improved means for tilting the plow relative to the beam.

A further object of the invention is to provide in a plow tiltable relative to the beam a caster carried at or in the rear of the heel of the plow adapted to carry the weight of the plow when the plow is tilted with the point upwardly.

A further object of the invention is to provide improved connection between a plow and a beam to permit of the tilting of the beam.

A further object of the invention is to provide an improved truck to which the several tiltable plows are attached in gang.

A further object of the invention is to provide improved means for attaching plows in gang to a truck.

A further object of the invention is to provide in a gang plow truck improved means for holding the truck wheels in parallelism.

A further object of the invention is to provide in a gang plow truck improved draft means to prevent jarring and breakage of the plow or harnesses.

With these and other objects in view the invention comprises certain novel constructions, combinations and arrangements of parts as will be hereinafter more fully described and claimed.

In the drawings:—Figure 1 is a top plan view of the improved gang plows. Fig. 2 is a view of the gang plows in side elevation seen from the mold-board side. Fig. 3 is a view of the gang of plows in front elevation. Fig. 4 is a view in rear elevation of one of the plows. Fig. 5 is a view of one of the plows in side elevation seen from the land side. Fig. 6 is a view of the frog seen from the mold-board side with the mold-board and share removed. Fig. 7 is a perspective view of the channel member employed for positioning the lower movable end of the beam. Fig. 8 is a view in edge elevation of the truck connecting links.

Like characters of reference indicate corresponding parts throughout the several views.

The improved plow structure which forms the subject matter of this application comprises a frame 10 provided at its opposite ends with vertical bearings 11 and 12 through which are extended respectively pivoting shafts 13 and 14. The shafts 13 and 14 are turned outwardly at their lower ends to form bearings for truck wheels 15 and 16, the shaft 14 being curved to hold the wheel 16 at an inclination to run in a furrow in the usual well known manner. The shafts 13 and 14 are respectively provided with crank arms 17 and 18 connected by a connecting bar composed of two central pivoted sections 19 and end sections 20 telescopingly connected so that the length of such compound bar can be varied to vary the relation of the wheels 15 and 16.

At the front of the frame 10 a draft bar 21 is secured by means of bolts 22 and 23, a link 24 being provided for sliding upon the bolt 22 while the end of the draft bar 21 slides directly upon the bolt 23. The bolts 22 and 23 are respectively provided with springs 25 and 26 against which the draft bar yieldingly abuts. The draft is applied to the draft bar by means of a link 27 pivotally and adjustably connected with the draft bar 21 as at 28 and extending beyond such pivot 28 to the pivot 29 at which point it is connected with the part 19. It will be apparent therefore that draft applied to the link 27 will be first transmitted to the draft bar 21 and through the springs 25 and 26 to the frame 10. The springs 25 and 26 are made sufficiently strong so that they are not compressed under the stress of ordinary draft, and are only compressed momentarily at starting or when an obstruction is encountered and such momentary displacing of the wheels is found to be no particular detriment to the operation of the plow. To the frame 10 are pivotally secured beams 30 by means of ears 31 carried upon said frame 10. The beams are held in rigid lateral relation to the frame 10 by means of braces 32 provided with turn buckles 33 by which arrangement the exact relation of the beams to the frame may be adjusted.

At their rear and lower ends the beams are connected with the plows comprising mold-boards 34 and shares 35 rigidly secured to a frog 36. The connection between the frog and the plow is accomplished by means of an extension 37 rigidly secured to or forming a part of the frog and extending upwardly beside the beam to which it is pivoted as at 38. At its bottom the frog is provided with a channel member 39 rigidly secured thereto in which the lower end of the beam 30 moves longitudinally and slidably, the position and relation of the end of the beam and the channel member being shown at 40 in Fig. 4. To provide for a movement of the plow upon the beam 30 the extension 37 is provided with a plurality of holes 41 in which are pivoted links 42 extending forwardly to and pivotally connected with levers 43 which said levers are pivotally connected with the beams 30 as at 44. The beams also carry segments 45 and the levers 43 are adjustably connected with such segments in the usual manner. At the rear the frog 36 carries a caster 45 adapted to engage the ground when the plow is tilted with the point upwardly by tilting the levers 43 rearwardly so that the weight of the plows is carried upon the casters 45 when being transported.

I claim:—

1. In a plow, the combination with a beam formed with a downwardly extending bowed end, of a frog having an extension arm pivotally mounted on the bowed end of said beam; a mold-board and share rigidly connected to said frog, a channel member secured to the lower edge of said frog, and extending between said frog and mold-board, the lower end of said beam resting in said channel member and a rod connected to the upper end of said extension arm, and arranged to rock the same about said pivotal connection with said beam.

2. In a plow, a beam, a frog provided with a channel member at its bottom, pivot connection between the beam and the frog with the lower end of the beam slidably mounted in the channel member, and means carried by the beam for adjusting the plow tiltably relative to the beam.

In testimony whereof I affix my signature in presence of two witnesses.

CHARLES E. NORTH.

Witnesses:
 WARREN W. TOLMAN,
 LANE KRAFFT.

Copies of this patent may be obtained for five cents each, by addressing the "Commissioner of Patents, Washington, D. C."